United States Patent Office 3,794,618
Patented Feb. 26, 1974

3,794,618
NITROGEN-CONTAINING POLYCONDENSATES, A PROCESS FOR THEIR PRODUCTION AND THEIR APPLICATION
Wilhelm Rating, Wuppertal-Barmen, Arnold Dobbelstein, Wuppertal-Elberfeld, and Horst Holfort, Wuppertal-Langerfeld, Germany, assignors to Bayer Aktiengesellschaft, Leverkusen, Germany
No Drawing. Continuation of abandoned application Ser. No. 884,310, Dec. 11, 1969. This application Mar. 29, 1972, Ser. No. 239,324
Int. Cl. C08g 33/02
U.S. Cl. 260—47 C  11 Claims

ABSTRACT OF THE DISCLOSURE

Thermosetting nitrogen-containing polycondensates useful as insulating coating agents for electrical conductors comprising in condensed form
(D) $n_D$ mol of a compound of the formula

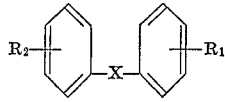

wherein X is a direct carbon to carbon bond, a bivalent $C_1$ to $C_4$ hydrocarbon radical, —S—, —SO$_2$—, or —O—, at least one of $R_1$ and $R_2$ is

—NH—CHR$_3$—COOH wherein $R_3$ is hydrogen or a $C_1$ to $C_4$ monovalent hydrocarbon radical, a $C_1$ to $C_4$ monovalent hydrocarbon radical substituted by a carboxyl group and any remaining $R_1$ and $R_2$ radical is hydrogen or $n_D$ mol of a $C_1$ to $C_5$ alkanol ester of said compound of said formula, $n_D$ being 0.1 to 1 mol;
(C) $1-n_D$ mol of a carboxylic acid having a functionality $F_C$ of from 2 to 4 selected from the group consisting of terephthalic acid, isophthalic acid, trimellitic acid, trimesic acid, pyromellitic acid, p-aminobenzoic acid, 3,3′,4,4′-benzophenone tetracarboxylic acid and the esters and anhydrides of said acids;
(B) $n_B$ mol of an organic polyisocyanate or polyisothiocyanate, $n_B$ being equal to

wherein $F_B$ is the functionality of (B) and has a value of from 2 to 6 and
(A) (0.7 to 3.5) ($F_C$−1)−$n_B$ mol of a member selected from the group consisting of ethane diol, propane diol, butane diol, neopentyl glycol, di- and polyethylene glycols, di- and polypropylene glycols, 4,4′-dihydroxy-diphenyl-2-propane, 4,4′-dihydroxydicyclohexyl-2-propane, 4,4′-dihydroxyethoxy-diphenyl-2-propane, glycerol, trimethylol propane, trimethylol ethane, trishydroxyethyl isocyanurate, pentaerythritol, sorbitol, mannitol, diglycerol, dipentaerythritol, 4,4′-diaminodiphenylmethane; 4,4′-diaminodiphenylether, m- and p-phenylene diamine, bis-4-aminophenyl-1, 1-cyclohexane, 4,4′-diaminodiphenylsulphone; 2,4-, 2,5-, and 2,6-tolylene diamine, hexamethylene diamine, m- and p-aminobenzoic acid, monoethanolamine and mixtures thereof
and process of producing same.

CROSS-REFERENCE TO RELATED APPLICATION

This application is a continuation of application Ser. No. 884,310 filed Dec. 11, 1969, and now abandoned.

This invention relates to novel nitrogen-containing polycondensates, a process for their production and their use, in particular for the production of insulating coatings and mouldings.

It is known that synthetic resins can be obtained from polycarboxylic acids and polyols and optionally polyamines. Among these synthetic resins, the so-called polyester imides in particular have acquired significance in the insulation of electrical conductors (British patent specifications 1,067,541 and 1,067,542.) Condensation resins of this kind are used in pure form or in combination with other materials inter alia for the production of electrical insulating materials.

One of the most common systems of this kind is for example the combination of these synthetic resins with di- and poly-isocyanates which generally leads to synthetic resins containing urethane groups (British patent specification 1,082,181, page 3, line 17.)

In addition to excellent mechanical and electrical properties, the products are required to have an ever increasing resistance to high temperatures for application in the field of electrical insulating materials in particular.

It has been found in practice that the requirement for an outstanding resistance to high temperatures can only be satisfied by using polycarboxylic acids with aromatically bound carboxyl groups for the production of the polycondensates referred to (British patent specifications 1,067,541 and 1,067,542.) Accordingly, aliphatic polycarboxylic acids are generally not used, or in limited quantities only, for improving solubility for example. Unfortunately, the synthetic resins produced in accordance with the prior art and the coatings obtained from them on electrical conductors do not satisfy technical requirements in every respect. For example, their resistance to chemicals is far from satisfactory. From the technical point of view, however, this is of particular significance where they are used in electrical installations and machines such as transformers, motors and the like that are exposed to chemical solvents. One particular example of this is the production of so-called hermetic motors. In the manufacture of these devices, the insulated electrical conductors are exposed to the influence of perchlorethylene for example. During operation, they operate to some extent in refrigerants such as fluorinated hydrocarbons.

The object of the present invention is to manufacture synthetic resins which show improved properties, especially in cases where insulating coatings on electrical conductors are produced from them. These coatings are intended to show an outstanding resistance to organic solvents, especially those of the aforementioned kind, coupled with extreme hardness, high elasticity, satisfactory processing properties and ease of production.

Accordingly, the present invention relates to a process for the production of nitrogen-containing polycondensates by polycondensing at least bifunctional alcohols, amines or amino alcohols or mixtures thereof (component A) with polyfunctional carboxylic acids containing at least one aromatic ring or their derivatives reactive with A (component C) and optionally organic polyiso- or polyisothio-cyanates (component B), in which process one mol of carboxylic acids with at least one aromatic ring and a functionality of $F_C$=2–4 or their derivatives reactive with (A) (component (C)), component (C) consisting of $n_D$=0.1 to 1.0 mol of those carboxylic acids or their derivatives reactive with (A) in which at least one of the carboxyl groups is attached through a C-atom to an aromatically substituted amino group (component (C)), is reacted with (0.7 to 3.5)·($F_C$−1)−$n_B$ mol of at least bifunctional alcohols, amines or aminoalcohols or mixtures thereof (component (A)) and optionally with $$n_B = \frac{(0 \text{ to } 1.7) \cdot n_D}{F_B} \text{ mol}$$

of organic polyiso- or polyisothio-cyanates (component (B)) with a functionality of $F_B = 2-6$, preferably 2-3, iso- or isothio-cyanate groups per mol, at temperatures of from 100 to 350° C.; in cases where component (B) is jointly used as starting material, it is reacted with component (D), optionally in the presence of solvents and/or substances of components (A) and (C) which do not contain any groups reacting with iso- or isothio-cyanates faster than the imino groups of component (D), at temperatures of from 0 to 250° C. and preferably at temperatures of from 40 to 200° C., after which these reaction products and any residual components still present are condensed at temperatures of from 100 to 350° C. and preferably at temperatures of from 100 to 250° C.

The invention also relates to nitrogen-containing polycondensates obtained by the process described above suitable for use as insulating coating agents for electrical conductors.

The invention further relates to a process for the production of insulating coatings on electrical conductors by coating the conductors with a solution of curable nitrogen-containing condensation products obtained by the process described above.

The known synthetic resins may be produced from the following substances which are also generally used for the production of these synthetic resins. These substances may also be used for the production of the new polycondensation products according to the invention:

(A) At least bifunctional alcohols, amines or amino-alcohols such as ethane diol, propane diol, butane diol, neopentyl glycol, di- and poly-ethylene glycols, di- and polypropylene glycols, 4,4'-dihydroxydiphenyl - 2 - propane, 4,4' - dihydroxydicyclohexyl-2-propane, 4,4'-dihydroxyethoxydiphenyl-2-propane, glycerol, trimethylol propane, trimethylol ethane, tris-hydroxyethyl isocyanurate, pentaerythritol, sorbitol, mannitol, diglycerol, dipentaerythritol, 4,4' - diaminodiphenylmethane; 4,4'-diaminodiphenylether, m- and p-phenylene diamine, bis-4-amino-phenyl-1,1-cyclohexane, 4,4' - diaminodiphenyl sulphone; 2,4-, 2,5- and 2,6-tolylene diamine, hexamethylene diamine, m-, p-aminobenzoic acid, monoethanol amine and so on.

(C) Aromaic carboxylic acids or their derivatives reacting with (A) with a functionality of $F_C = 2-4$, such as terephthalic acid, isophthalic acid, trimellitic acid, trimesic acid, pyromellitic acid, p-aminobenzoic acid, 3,3',4,4'-benzophenone tetracarboxylic acid and so on, and their esters and/or anhydrides, etc.

It has now been found that polycondensates with outstanding general properties coupled with a high resistance to elevated temperatures can be obtianed by using as carboxylic acids of component (C) either wholly or in part as component (D) carboxylic acids of the kind in which the carboxyl groups is attached aliphatically through a C-atom to an aromatically substituted imino group. Compounds corresponding to the formula

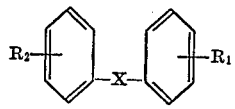

are particularly suitable for use as component (D); in this formula, X represents a direct C—C-bond between the two rings, a bivalent $C_1$ to $C_3$ hydrocarbon radical, —S—, —$SO_2$— or —O—; at least one of the radicals $R_1$ and $R_2$ represents the group

in which $R_3$ represents hydrogen or a substituent, preferably a $C_1$ to $C_4$ hydrocarbon radical optionally containing a carboxyl group or a functional derivative thereof or a derivative thereof reactive with component (A) and present either once or twice in each benzene ring, whilst the other symbols $R_1$ or $R_2$ represent hydrogen; their reactive derivatives such as their $C_1$ to $C_5$ alkanol esters, may also be used.

It is possible by virtue of the invention to obtain polycondensates or coatings based on them with particularly good properties in cases where some of the imino groups in the carboxylic acids according to component (D) are reacted with component (B), namely at least bifunctional iso- and isothiocyanates before the actual polycondensation with the alcohols, amines and aminoalcohols according to component (A). The reaction may also be carried out in the presence of solvents or substances according to (A) to (C) of the kind which do not contain any groups that react with iso- and isothio-cyanates faster than the imino groups of the carboxylic acids or carboxylic acid derivatives according to (D).

For example, the reaction between the iso- or isothio-cyanate groups and the imino hydrogen is much faster than the reaction between hydroxyl groups and iso- or isothiocyanate groups.

Accordingly, the reaction between components (B) and (D) can be carried out in the presence of for example alcohols according to (A) or in cresolic solution for example, but not in the presence of considerable quantities of primary or secondary amines because they react more quickly or at least quickly as the imino groups in the substances according to (D).

The optional reaction of the acids according to (D) with the iso- or isothio-cyanates is carried out at temperatures of from 0 to 250° C. and preferably at temperatures of from 49 to 200° C.

Examples of suitable polyiso- or polyisothio-cyanates (B) include aromatic, cycloaliphatic or aliphatic compounds, providing they contain at least two NCO— or NCS-groups in the molecule.

Where the synthetic resins are used for the production of insulating materials that are resistant to high temperatures, aromatic and in particular aromatically uncondensed binuclear compounds, for example diphenylmethane diisocyanate, optionally in admixture with other isocyanates, may be used with advantage as component (B). It is also possible to use so-called masked isocyanates in whose case the isocyanate groups are released on heating to temperatures of around 200° C., as starting materials.

In the foregoing, the letter "F" denotes the respective functionalities of the corresponding components (A), (B), (C) or (D). The symbol "$F_A$" thus denotes the functionality of the starting products used as component (A). The letter "$n$" denotes the mol numbers. For example, the letters "$n_A$" denote the mol number of the starting materials used as component A.

The components (A), (B) and (C) (according to the invention, from 10 to 100 mol percent of (C) must consist of (D) should be reacted with one another in such ratios that one mol of the carboxylic acids (C) are reacted with $(0.7 \text{ to } 3.5) \cdot (F_C - 1) - n_B$ mol of component (A) and optionally with $$n_B = \frac{(0 \text{ to } 1.7) \cdot n_D}{F_B}$$

mol of component (B).

If the synthetic resins are to be used for the production of temperature-resistant insulating materials, it is of advantage for component (B) to be used in the quantity $$n_B = \frac{(0.5 \text{ to } 1.25) \cdot n_D}{F_B}$$

If a mixture of $C_2$ to $C_4$ alkane diols and more than bivalent alcohols is used as component (A), resins with particularly favorable properties are obtained in cases where the quantity in which the more than bivalent alcohols are used is selected in such a way that the number of hydroxyl groups emanating from the polyhydric alcohols amounts to $$0.3(F_C - n_B F_B) \text{ to } 2.0(F_C - n_B F_B)$$

preferably $$0.7(F_C - n_B F_B) \text{ to } 1.3(F_C - n_B F_B)$$

The actual condensation of the alcohols, aminoalcohols, amines, the carboxylic acids according to (C)/(D) and optionally the reaction products between the iso- or isothio-cyanates and the carboxylic acids according to (D) is carried out at temperatures between 100 and 350° C. and preferably at temperatures between 100 and 250° C., optionally in the presence of catalysts. Removal of the water formed can be accelerated by an inert gas stream, by azotropic distillation with a solvent or by applying a vacuum.

Where derivatives of the carboxylic acid are used, the conventional methods of condensation may be used, such as trans-esterification, transamidation and so on.

The condensates according to the invention are readily soluble in phenol, cresols, xylenols, methyl glycol acetate, diacetone alcohol etc. and in mixtures of these solvents. The use of blended solvents such as xylene, solvent naphthas and so on is possible from case to case in varying quantities.

The solutions are stable and undergo only a slight change in viscosity even after prolonged storage. They may be directly used as wire lacquers or enamels after solids content and viscosity have been adapted to the wire thickness to be lacquered and the lacquering process by the addition of appropriate solvents.

To accelerate hardening, the lacquer film may have added to it alcoholates or metal salts of organic acids of magnesium, aluminium, titanium, zinc, cadmium, cerium, zirconium, manganese, copper. It is preferred to use organic titanic acid esters such as monomeric butyl titanate, polymeric butyl titanate, cresyl titanate or their polymerization products.

In many cases, it is also possible to combine the condensates according to the invention with conventional lacquer vehicles. Similarly, masked organic polyisocyanates may be added to control the properties, to increase cross-linking and to obtain special effects.

EXAMPLE 1

(a) 1.50 mols (555 g.) of N,N'-bis-(carbethoxymethyl)-4,4'-diaminodiphenylmethane are dissolved in 200 g. of dry cresol by heating to around 80° C. in a three-necked flask equipped with stirring mechanism, thermometer, a short column and a reflex condenser connected thereto through a distillation bridge. 0.76 mol (190 g.) of diphenylmethane-4,4'-diisocyanate are added to the solution heated to 80° C. in such a way that the temperature does not exceed 100° C. The mixture is stirred for 1 hour at 90 to 100° C., after which the temperature is increased slowly to around 180° C. The distillation of ethanol begins at around 120 to 140° C. After about 65 g. of ethanol have distilled over, 0.54 mol (50 g.) of glycerol and 2.10 mols (130 g.) of ethylene glycol are added and the temperature increased to 200–210° C. About another 70 g. of ethanol are distilled off at this temperature over a period of from 6 to 8 hours. 125 g. of a mixture of cresol and ethylene glycol are distilled off following an increase in temperature to 200–225° C. After cooling to around 180° C., the product is diluted with commercial cresol to form a 50% solution.

(b) To prepare a wire lacquer, 620 g. of this solution are admixed with 170 g. of solvent naphtha, 200 g. of cresol and 10 g. of a 30% cresyl titanate solution in cresol.

(c) A 0.8 mm. diameter copper wire is lacquered with this 31% lacquer in a conventional wire-lacquering machine (six passes) and stoved at around 460° C. Despite excellent elasticity, the resulting lacquered wire has a hardness of 4H, measured in accordance with DIN 46453, which remains intact even after 30 minutes' treatment with ethanol and trichloroethylene at 60° C.

EXAMPLE 2

(a) In a test apparatus of the kind described in Example 1, 150 mols (555 g.) of N,N'-bis-(carbethoxymethyl)-4,4'-diaminodiphenylmethane, 2.00 mols (124 g.) of ethylene glycol and 0.87 mol (80 g.) of glycerol are dissolved while heating to around 40–60° C. in 200 g. of dry commercial cresol, and 0.76 mol (190 g.) of diphenylmethane-4,4'-diisocyanate are added to the resulting solution.

The mixture is left to react with stirring for 1 hour at 70 to 80° C., for 1 hour at 90 to 100° C. and for 1 hour at 110 to 120° C. Following the addition of 0.5 g. of butyl titanate, the temperature is increased to 190–210° C. over a period of 2 to 3 hours, during which 138 g. of ethanol distill off. The mixture is kept at 210° C. for another 5 hours. Ethylene glycol and some of the cresol are then distilled off following a further increase in temperature or by reducing the pressure, until the viscosity of the resin, measured as a 33.3% solution in m-cresol, amounts to between 1500 and 2000 cp.

(b) 330 g. of the resin are dissolved with gentle heating in 470 g. of cresol and then diluted with stirring with 200 g. of xylene.

(c) Following the addition of 3 g. of cresol titanate, dissolved in approximately 10 g. of cresol, 0.5 mm. thick copper wires are coated with this lacquer in the usual way and then hardened.

The lacquered wires obtained show outstanding resistance to brief temperature stressing (heat shock) up to 300° C., extreme hardness of 5H coupled with excellent elasticity and a softening temperature above 350° C.

EXAMPLE 3

(a) 0.76 mol (190 g.) of diphenylmethane-4,4'-diisocyanate is added at 70 to 80° C. to a solution of 1.50 mols (555 g.) of N,N'-bis-(carbethoxymethyl)-4,4'-diaminodiphenylmethane in 200 g. of dry commercial cresol, and the mixture reacted for 2 hours at 90 to 110° C. 0.87 mol (80 g.) of glycerol and 2.90 mol (180 g.) of ethylene glycol and 1 g. of crystallized zinc acetate are then added.

The temperature is increased to 200–210° C. and kept at this level for 8 hours, during which 141 g. of ethanol distill off. 1.00 mol (192 g.) of trimellitic acid anhydride and 0.50 mol (99 g.) of 4,4'-diaminodiphenylmethane are then added and the mixture reacted for 5 hours, during which around 40 g. of aqueous distillate accumulate, at a temperature of from 210 to 220° C. Ethylene glycol and cresol are distilled off at reduced pressure until the viscosity of the resin, 33.3% in m-cresol, amounts to 1200 cp. at 25° C.

(b) The resin can be used to prepare a wire lacquer as in Example 2.

(c) A 0.8 mm. diameter copper wire lacquered with this lacquer shows outstanding heat resistance, has excellent elasticity and a high softening temperature.

EXAMPLE 4

(a) 0.75 mol (160 g.) of trimethyl hexamethylene diisocyanate are added dropwise over a period of 45 minutes at 60° C. to a solution of 1.5 mol (555 g.) of N,N'-bis-(carbethoxymethyl)-4,4'-diaminodiphenylmethane in 200 g. of dry cresol. The mixture is stirred for 2 hours at 80° C. after which it is admixed with 2.00 mols (124 g.) of ethylene glycol, 0.54 mol (50 g.) of glycerol and 0.5 g. of cadmium acetate. Following an increase in temperature to 210–220° C., around 140 g. of ethanol are distilled off over a period of 8 hours.

By reducing the pressure or by increasing the temperature to around 240° C., another 95 g. of a mixture of cresol and ethylene glycol are distilled off. The resin obtained has a viscosity of 1650 cp. at 25° C. (33.3% solution in m-cresol) and is soluble in the solvent mixtures normally used for the production of wire lacquers.

(b) Glass cloths can be impregnated with a 40% solution of this resin in a mixture of cresol and xylene (2:1). After brief evaporation at room temperature, the fabric is dried for 30 minutes at 100° C. To produce a laminate, several of the predried cloths were placed one on top of the other and then pressed in a press under increasing pressure and at a temperature of around 200° C. The resulting laminate is resistant to high temperatures and to the effect of conventional solvents and shows outstanding flexural strength.

EXAMPLE 5

(a) 1.50 mol (555 g.) of N,N'-bis-(carbethoxymethyl)-4,4'-diaminodiphenylmethane, 1.00 mol of glycerol (92 g.), 1.60 mol (100 g.) of ethylene glycol and 0.7 g. of zinc acetate are transesterified for 8 hours at 220° C. 198 g. of ethanol are distilled off during transesterification. On completion of transesterification, ethylene glycol is distilled off at reduced pressure until the viscosity of the resin, measured as a 33.3% solution in m-cresol at 25° C., amounts to between about 1800 and 2200 cp.

(b) After cooling to around 160° C., the viscous melt is diluted with 570–600 g. of commercial cresol to form a 50% solution. A lacquer is obtained by further dilution with solvent naphtha to a solids content of around 40%.

(c) This lacquer is applied to sheet iron and stoved for one hour at 240° C. The film obtained is extremely hard and shows outstanding resistance to solvents and heat.

EXAMPLE 6

(a) 1.5 mols (375 g.) of 1-carbethoxymethylamino-4-carbethoxybenzene are dissolved in 500 g. of dry cresol and the resulting solution reacted for 2 hours at 80 to 100° C. with 0.76 mol (190 g.) of diphenylmethane-4.4'-diisocyanate. Following the addition of 0.54 mol (50 g.) of glycerol, 0.71 mol (44 g.) of ethylene glycol and 0.6 g. of zinc acetate, the temperature is increased to around 210° C. The ethyl alcohol liberated during the reaction is separated off through the column. After 12 hours' condensation at around 210° C., the resin is diluted with commercial cresol to a solids content of exactly 50%.

(b) 3 g. of cresyl titanate, dissolved in 20 g. of cresol, 200 g. of xylene and 120 g. of cresol are added to 660 g. of this solution.

(c) Copper wires 0.3 mm. in diameter are coated with this lacquer in the usual way. A lacquered wire with a high resistance to solvents and excellent dielectric strength is obtained. Its hardness amounts to 5H.

What is claimed is:
1. A process for producing a nitrogen-containing polycondensate which comprises reacting at a temperature of 100 to 350° C.

(D) $n_D$ mol of a compound of the formula

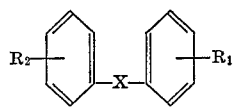

wherein X is a direct carbon to carbon bond, a bivalent $C_1$ to $C_4$ hydrocarbon radical, —S—, —SO$_2$— or —O—, at least one of $R_1$ and $R_2$ is

—NH—CHR$_3$—COOH wherein $R_3$ is hydrogen, a $C_1$ to $C_4$ monovalent hydrocarbon radical or a $C_1$ to $C_4$ monovalent hydrocarbon radical substituted by a carboxyl group and any remaining $R_1$ and $R_2$ radical is hydrogen or $n_D$ mol of a $C_1$ to $C_5$ alkanol ester of said compound of said formula, $n_D$ being 0.1 to 1 mol;

(C) 1—$n_D$ mol of a carboxylic acid having a functionality $F_C$ of from 2 to 4 selected from the group consisting of terephthalic acid, isophthalic acid, trimellitic acid, trimesic acid, pyromellitic acid, p-aminobenzoic acid, 3.3',4,4'-benzophenone tetracarboxylic acid and the esters and anhydrides of said acids;

(B) $n_B$ mol of an organic polyisocyanate or polyisothiocyanate, $n_B$ being equal to $$\frac{(0 \text{ to } 1.7)n_D}{F_B}$$

wherein $F_B$ is the functionality of (B) and has a value of from 2 to 6 and (A) (0.7 to 3.5) ($F_C$—1)—$n_B$ mol of a member selected from the group consisting of ethane diol, propane diol, butane diol, neopentyl glycol, di- and polyethylene glycols, di- and polypropylene glycols, 4,4'-dihydroxy-diphenyl-2-propane, 4,4'-dihydroxy-dicyclohexyl-2-propane, 4,4'-dihydroxyethoxy-diphenyl-2-propane, glycerol, trimethylol propane, trimethylol ethane, tris-hydroxyethyl isocyanurate, pentaerythritol, sorbitol, mannitol, diglycerol, dipentaerythritol, 4,4'-diaminodiphenylmethane; 4,4'-diaminodiphenylether, m- and p-phenylene diamine, bis-4-aminophenyl-1, 1-cyclohexane, 4,4'-diaminodiphenylsulphone; 2,4-, 2,5- and 2,6-tolylene diamine, hexamethylene diamine, m- and p-aminobenzoic acid, monoethanolamine and mixtures thereof.

2. The process of claim 1 wherein said temperature is from 100 to 250° C.

3. The process of claim 1 wherein said $C_1$ to $C_5$ alkanol ester of said compound of said formula is employed as component (D).

4. The process of claim 1 wherein $n_B$ is $$\frac{(0.5 \text{ to } 1.25)n_D}{F_B}$$

5. The process of claim 1 wherein component (B) is an aromatic polyisocyanate.

6. The process of claim 1 wherein component (B) is diphenylmethane diisocyanate.

7. A thermosetting nitrogen-containing polycondensate which comprises, in condensed form, (D) $n_D$ mol of a compound of the formula

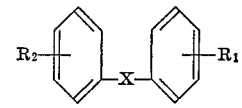

wherein X is a direct carbon to carbon bond, a bivalent $C_1$ to $C_4$ hydrocarbon radical, —S—, —SO$_2$— or —O—, at least one of $R_1$ and $R_2$ is

—NH—CHR$_3$—COOH wherein $R_3$ is hydrogen, a $C_1$ to $C_4$ monovalent hydrocarbon radical or a $C_1$ to $C_4$ monovalent hydrocarbon radical substituted by a carboxyl group and any remaining $R_1$ and $R_2$ radical is hydrogen or $n_D$ mol of a $C_1$ to $C_5$ alkanol ester of said compound of said formula, $n_D$ being 0.1 to 1 mol;

(C) 1—$n_D$ mol of a carboxylic acid having a functionality $F_C$ of from 2 to 4 selected from the group consisting of terephthalic acid, isophthalic acid, trimellitic acid, trimesic acid, pyromellitic acid, p-aminobenzoic acid, 3,3',4,4'-benzophenone tetracarboxylic acid and the esters and anhydrides of said acids;

(B) $n_B$ mol of an organic polyisocyanate or polyisothiocyanate, $n_B$ being equal to $$\frac{(0 \text{ to } 1.7)n_D}{F_B}$$

wherein $F_B$ is the functionality of (B) and has a value of from 2 to 6 and (A) (0.7 to 3.5) $(F_C-1)-n_B$ mol of a member selected from the group consisting of ethane diol, propane diol, butane diol, neopentyl glycol, di- and polyethylene glycols, di- and polypropylene glycols, 4,4′-dihydroxy-diphenyl-2-propane, 4,4-dihydroxydicyclohexyl-2-propane, 4,4′-dihydroxyethoxy-diphenyl-2-propane, glycerol, trimethylol propane, trimethylol ethane, tris-hydroxyethyl isocyanurate, pentaerythritol, sorbitol, mannitol, diglycerol, dipentaerythritol, 4,4′-diaminodiphenylmethane; 4,4′-diaminodiphenylether, m- and p-phenylene diamine, bis-4-aminophenyl-1, 1-cyclohexane, 4,4′-diaminodiphenylsulphone, 2,4-, 2,5- and 2,6-tolylene diamine, hexamethylene diamine, m- and p-aminobenzoic acid, monoethanolamine and mixtures thereof.

8. The thermosetting nitrogen-containing polycondensate of claim 7 wherein said $C_1$ to $C_5$ alkanol ester of said compound of said formula is employed as component (D).

9. The thermosetting nitrogen-containing polycondensate of claim 7 wherein $n_B$ is $$\frac{(0.5 \text{ to } 1.25)n_D}{F_B}$$

10. The thermosetting nitrogen-containing polycondensate of claim 7 wherein component (B) is an aromatic polyisocyanate.

11. The thermosetting nitrogen-containing polycondensate of claim 7 wherein component (B) is diphenylmethane diisocyanate.

References Cited
UNITED STATES PATENTS

| | | | |
|---|---|---|---|
| 3,705,874 | 12/1972 | Merten et al. | 260—47 CP |
| 3,397,253 | 8/1968 | Merten et al. | 260—830 |
| 2,945,009 | 7/1960 | Caldwell et al. | 260—75 |

LESTER L. LEE, Primary Examiner

U.S. Cl. X.R.

117—124 E, 128.4, 161 UN; 161—197; 260—75 N, 77.5 AQ, 77.5 AM, 78A, 78 TF, Dig 34